(12) United States Patent
Niinobe et al.

(10) Patent No.: US 6,787,703 B2
(45) Date of Patent: Sep. 7, 2004

(54) CONNECTION STRUCTURE AND CONNECTION MEMBER FOR ELECTRICAL CONNECTION OF POWER CABLES

(75) Inventors: Hiroshi Niinobe, Chiba (JP); Kazuo Watanabe, Chiba (JP)

(73) Assignee: Fujikura Ltd., Tokyo (JP)

(*) Notice: Subject to any disclaimer, the term of this patent is extended or adjusted under 35 U.S.C. 154(b) by 114 days.

(21) Appl. No.: 10/304,778

(22) Filed: Nov. 27, 2002

(65) Prior Publication Data

US 2003/0188885 A1 Oct. 9, 2003

(30) Foreign Application Priority Data

Nov. 27, 2001 (JP) .................................. P2001-361148
Dec. 7, 2001 (JP) .................................. P2001-374124

(51) Int. Cl.[7] .............................................. H02G 15/08
(52) U.S. Cl. ...................... 174/73.1; 174/84 R; 174/85; 174/87; 174/93; 174/70 R; 174/68.1; 174/135
(58) Field of Search .............................. 174/73.1, 84 R, 174/85, 87, 93, 135, 70 R, 68.1

(56) References Cited

U.S. PATENT DOCUMENTS

| 5,171,940 A | 12/1992 | Vallauri |
| 5,294,752 A | 3/1994 | Vallauri et al. |
| 5,365,020 A | 11/1994 | Vallauri et al. |
| 5,844,170 A | 12/1998 | Chor et al. |
| 6,171,669 B1 | 1/2001 | Vallauri et al. |
| 6,281,442 B1 | 8/2001 | Guzowski |

FOREIGN PATENT DOCUMENTS

| JP | 64-050712 | 2/1989 |
| JP | 08-022716 | 1/1996 |
| JP | 08-050807 | 2/1996 |
| JP | 11-041779 | 2/1999 |
| JP | 2000-166075 | 6/2000 |
| JP | 2000-175343 | 6/2000 |
| JP | 2000-175344 | 6/2000 |
| JP | 2000-188822 | 7/2000 |
| JP | 2000-299920 | 10/2000 |
| JP | 2000-312430 | 11/2000 |
| JP | 2001-069658 | 3/2001 |
| JP | 2001-126562 | 5/2001 |
| JP | 2002-281652 | 9/2002 |

*Primary Examiner*—Anthony Dinkins
*Assistant Examiner*—Jinhee Lee
(74) *Attorney, Agent, or Firm*—Oblon, Spivak, McClelland, Maier & Neustadt, P.C.

(57) ABSTRACT

A cylindrical pre-molded rubber insulation tube made by a plurality of layers using a rubber material as a base material has in a central part and at both ends of an inner periphery thereof a sheet-shaped electrode layer formed at an insde thereof with a semi-conductive rubber layer and at an outside thereof with a high-permittivity rubber layer, as an inner electrode layer configured with the semi-condutctive rubber layer to be thin and sheet-shaped and the high-permittivity rubber layer covering a vicinity of a respective distal end of the semi-conductive rubber layer, and the distal end of the semi-conductive rubber layer is rounded by a radius of curvature substantially equal to half the thickness.

21 Claims, 7 Drawing Sheets

CONNECTION STRUCTURE AND CONNECTION MEMBER FOR ELECTRICAL CONNECTION OF POWER CABLES

BACKGROUND OF THE INVENTION

1. Field of the Invention

The present invention relates to a connection structure and a connection member for electrical connection of power cables.

2. Description of Relevant Art

The power cable is constituted with: a cable conductor (hereafter sometimes simply called "conductor") configured as a bundle of core wires for transmission of required electric power; a cable insulator (hereafter sometimes simply called "insulator") configured for insulation about the conductor and made of, for example, a plastic material such as bridged polyethylene; a cable screen (hereafter sometimes simply called "screen") configured for electric screening about the insulator, and a cable outer cover (hereafter sometimes simply called "outer cover" or "cover") configured for coverage and protection about the screen.

It therefore is necessary for electrical connection of power cables to employ a connection structure that has, as portions thereof, respective connection elements adaptive for power transmission, insulation, electric screening, and coverage and protection, and is provided with related considerations, in particular, for ensured prevention of breakdown due to insulation breakage at a connection portion for insulation.

In this respect, for power cables transmitting medium-voltage or high-voltage power, having great potential differences between a connection portion for power transmission and a connection portion for electric screening, there is needed a severe check for possible insulation breakage due to local concentration of electric field or stress.

This is specifically discussed below.

FIG. 9 illustrates a conventional connection structure CN100 employed for electrical connection between a pair of medium- or high-voltage power transmitting and plastic-insulated power cables PC1 and PC2, showing a longitudinal section at one side about an axis C.

The connection structure CN100 includes: a power transmitting connection portion (hereafter sometimes called "power transmitting portion" or "transmission portion") 120 configured for electrical connection between stripped conductors 2 and 2 (more specifically, conductor ends, like intra) of power cables PC1 and PC2 at the left and right; a screening connection portion (hereafter sometimes called "screening portion") 130 configured for electrical connection between stripped screens 6 and 6 of power cables PC1 and PC2; an insulating connection portion (hereafter sometimes called "insulating portion") 140 filled between the transmission portion 120 and the screening portion 130 and configured to conformingly fit on stripped plastic insulators 5 and 5 of power cables PC1 and PC2; and a covering and protecting connection portion (hereafter sometimes called "covering portion) 150 configured, as a two-piece separable protection case in the figure, to water-lightly fit on outer covers 7 and 7 of power cables PC1 and PC2, covering outer periphery of the: screening portion 130.

Like later-described corresponding embodiments of the invention, the covering portion may be configured, not simply as a two-piece separable protection case, but also as a structure in which a thermally shrinkable tube made of polyethylene or equivalent is fit water-tight on the screening portion, or as a structure in which the screening portion is covered by a glass-fiber reinforced epoxy resin tube, with a compound filled water-tight in between.

The transmission portion 120 is configured with a tubular conductor 8 fit on ends of the cable conductors 2 and 2, a layer 9 of conductive rubber tape wound-fit on the tubular conductor 8 and remaining stripped parts of the cable conductors 2 and 2, and a buried relatively thick inner electrode 121 fit conforming on the wound layer 9 of rubber tape and ends of the cable insulators 5 and 5.

The internal electrode 121 is molded by filling a semi-conductive rubber material in a dedicated die therefor, as a substantially tubular member having at both ends thereof axially protruding outer peripheral parts 121a and 121b.

The screening portion 130 is configured as a tubular outer electrode 131 with tapered end faces 131a and 131b at both ends, which is molded by filling a semi-conductive rubber material in a dedicated die therefor.

The insulating portion 140 is configured as a tubular insulating member 141 with tapered end faces 141a and 141b at both ends, which is made, by filling a polyethylene propylene base rubber material in a dedicated die with preset molds of inner and outer electrodes 121 and 131, as an integral pre-molded connection member PM100.

Like later-described corresponding embodiments of the invention, the insulating portion may be prefabricated, before filling a semi-conductive rubber material to form the outer electrode As a desideratum, there has been needed a power cable connection structure of connection member allowing reduction of cost in such manufacture.

The connection structure CN100 of FIG. 9, employed for medium- or high-voltage power transmission, has great potential differences developed between the inner electrode 121 and the outer electrode 131, and needs severe prevention against breakdown of insulation member 141 due to electric stress concentration. It therefore has structures shown in FIG. 10A and FIG. 10B.

FIG. 10A and FIG. 10B are details of part-A and part-B of FIG. 9, respectively.

In the connection structure CN100, for prevention of insulation breakdown, each end of inner electrode 121 (FIG. 10A simply shows the right end 121b.) has an edge thereof rounded by a relatively large radius R as shown in FIG. 10A, to be 10 mm or more thick at the end, resulting in a radius difference exceeding 30 mm between the inside diameter of inner electrode 121 and the outside diameter of outer electrode 131 in FIG. 9, i.e., the thickness of pre-molded connection member PM100, of which reduction also has been a desideratum.

Further, in the connection structure CN100, as shown in FIG. 10B, the outer electrode 131 is formed as an electric field controlling stress cone large of radius to simply conform to the cable screen 6, resulting in a relatively large dimension in thickness as well as in length thereof, leading to a long size of connection.

SUMMARY OF THE INVENTION

The present inventors made eager investigations in view of the foregoing points, to find that a rubber electrode layer constituted as a sheet-shaped semi-conductive rubber layer covered (i.e. coated or laminated) at a prescribed region thereof with a rubber layer high of permittivity (i.e. dielectric constant) can be used as a screening electrode in a power-transmitting portion and/or an electric screening portion to control the concentration of electric stress in insulator within a vicinity of the covered region, to a significant degree.

In addition the high-permittivity rubber layer can achieve the control of electric stress concentration at a successfully effective level in practice, providing that it has a high specific permittivity ($\epsilon_h$) equal to or greater than a specific permittivity ($\epsilon_c$) of cable insulator times five. For example, for a typical $\epsilon_c$=2.3, the high-permittivity $\epsilon_h$ may well be 15 to practically achieve a definite reduction in thickness of pre-molded connection member. It is noted that this condition ($\epsilon_h$=15) is met in any of later-described embodiments of the invention.

The content of find is illustrated for particular cases in FIG. 11A and FIG. 11B, where like elements of FIG. 10 are designated by like reference characters to omit redundancy.

FIG. 11A illustrates a connection structure in which a rubber electrode layer RE constituted as a sheet-shaped semi-conductive rubber layer SC covered at an outer periphery thereof with a high-permittivity rubber layer HP is interposed between a rubber tape wound layer 9 of a power transmitting portion and a rubber layer EPR of an insulating portion, and extended on an outer periphery of a cable insulator 5, whereby it is allowed to terminate an end SCa of the semi-conductive rubber layer SC by an extremely small radius r.

FIG. 11B illustrates a connection structure in which a rubber electrode layer RE constituted as a sheet-shaped semi-conductive rubber layer SC covered at an outer periphery thereof with a high-permittivity rubber layer HP is interposed between a cable screen 6 and a rubber layer EPR of an insulating portion, and extended on an outer periphery of a cable insulator 5, whereby, like the case of power transmitting portion described above, it is allowed to terminate an end SCa of the semi-conductive rubber layer SC by an extremely small radius r. Also the thickness of a semi-conductive rubber make outer electrode SCo can be extremely small.

For medium/high-voltage power oriented CV cables, the radius r of termination can be preferably set to r=0.5 mm or more.

The sheet-shaped semi-conductive rubber layer SC can be preferably configured at a side part thereof to lift off, i.e., to come up at a distance from the cable insulator 5, penetrating (see FIG. 6) or extending (see FIG. 7) to the interior of a corresponding part of the high-permittivity rubber layer HP. In this case, the length by which the side part of semi-conductive rubber layer SC penetrates or extends, or in other words, the length (L1 in FIG. 6 or FIG. 7) by which an inner part of high-permittivity rubber layer HP extends inside the semi-conductive rubber layer SC of a tubular form and contacts on the cable insulator 5 can be preferably set to 10 mm or less; and an axial extension or remaining width of the corresponding part of high-permittivity rubber layer HP, or in other words, the length (L2 in FIG. 6 or FIG. 7) or distance from a distal end of rounded part of semi-conductive rubber layer SC to an edge at end of high-permittivity rubber layer HP can be preferably set within a range over 5 mm, to an adequate dimension to be determined by an electric field analysis so that the electric stress concentration is kept under a critical value.

For a certain range of power to be transmitted, the semi-conductive rubber layer SC can be left without round termination.

The present invention is made with such points in view. It therefore is an object of the invention to provide on the basis of investigation results described, a connection structure and a connection member for electrical connection of power cables adapted for effective reduction in cost of manufacture and dimensional difference described.

To achieve the object, according to an aspect of the invention, a connection structure for electrical connection of power cables comprises a transmission portion having a first rubber electrode configured for electrical connection of a cable conductor, a screening portion having a second rubber electrode configured for electrical connection of a cable screen, and an insulating portion having a rubber insulator configured for insulation between the first and second rubber electrodes, and at least one of the first and second rubber electrodes comprises a rubber electrode layer configured with a sheet-shaped semi-conductive rubber layer, and a high-permittivity rubber layer covering at least one side of a peripheral part of the semi-conductive rubber layer.

According to another aspect of the invention, a connection member for electrical connection of power cables comprises a first rubber electrode configured for electrical connection of a cable conductor, a second rubber electrode configured for electrical connection of a cable screen, and a rubber insulator configured for insulation between the first and second rubber electrodes, and at least one of the first and second rubber electrodes comprises a rubber electrode layer configured with a sheet-shaped semi-conductive rubber layer, and a high-permittivity rubber layer covering at least one side of a peripheral part of the semi-conductive rubber layer.

According to those aspects, a rubber electrode layer having a sheet-shaped semi-conductive rubber layer covered with a high-permittivity rubber layer on at least one side of a peripheral part of the semi-conductive rubber layer is used as a rubber electrode of a power transmitting portion or of a screening portion, and controls the electric stress concentration in a rubber insulator at least within a vicinity of the peripheral part.

Accordingly, an end face of the rubber electrode is allowed to vary within a range of curvature under an increased upper limit, or within a range of radius of curvature over a decreased lower limit, with a commensurate contribution for the connection member to be thick, or for the condition of manufacture to be moderated, with decreased cost.

BRIEF DESCRIPTION OF THE ACCOMPANYING DRAWINGS

The above and further objects and novel features of the present invention will more full appear from the following detailed description when the same is read in conjunction with the accompanying drawings, in which.

DETAILED DESCRIPTION OF THE PREFERRED EMBODIMENTS

Figure 1:
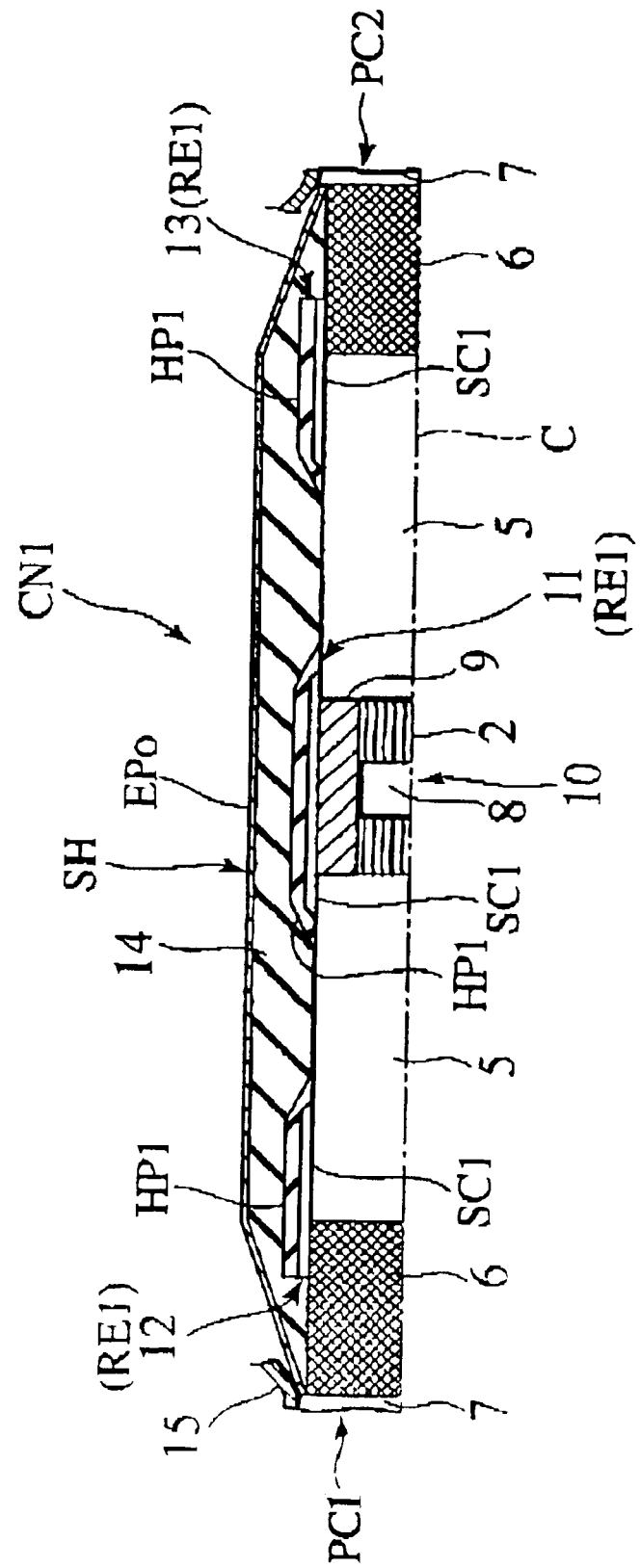
FIG. 1 is a longitudinal section of a connection structure for power cables according to an embodiment of the invention.

There will be detailed below the preferred embodiments of the invention with reference to the accompanying drawings FIG. 1 to FIG. 8. Like members are designated by like reference characters.

FIG. 1 shows a connection structure CN1 for a pair of plastic-insulated power cables PC1 and PC2 according to a first embodiment of the invention.

The connection structure CN1 includes: a transmission portion 10 configured for electrical connection between stripped conductors 2 and 2 of power cables PC1 and PC2 at the left and right; a screening portion SH configured for electrical connection between stripped screens 6 and 6 of power cables PC1 and PC2; an insulating portion 14 filled between the transmission portion 10 and the screening portion SH and configured to conformingly fit on stripped bridged-plastic insulators 5 and 5 of power cables PC1 and PC2; and a two-piece separable protection case 15 configured to water-tightly fit on outer covers 7 and 7 of power cables PC1 and PC2, covering an outer periphery of the screening portion SH.

The transmission portion 10 is configured with a tubular conductor 8 fit on ends of the cable conductors 2 and 2, a layer 9 of conductive rubber tape wound-fit on the tubular conductor 8 and remaining stripped parts of the cable conductors 2 and 2, and a relatively thin cylindrical rubber electrode 11 disposed in a central part of an inner periphery of the insulating portion 14 and fit conforming on the wound layer 9 of rubber tape and ends of the cable insulators 5 and 5.

The screening portion SH is configured with thin cylindrical rubber electrodes 12 and 13 disposed near left and right ends of the inner periphery of insulating portion 14 and electrically contacting on the cable screens 6 and 6, and an outer electrode EPo made by a layer of semi-conductive rubber tape or aluminum foil wound at the working site on the entirety of an outer periphery of the insulating portion 14.

The insulating portion 14 is formed by winding a rubber tape about the rubber electrodes 11, 12, and 13 up to a prescribed insulation thickness. It is thus formed as a tubular rubber insulator tapered at both ends, and fit on the cable insulators 5 and 5, for insulation between the rubber electrodes 11, 12, and 13. This rubber insulator may be molded by filling a rubber in a die.

The rubber electrodes 11, 12, and 13 are constituted as tubular rubber electrode layers RE1 extending along the inner periphery of insulating portion 14 and spaced from each other. Each rubber electrode RE1 is configured with a sheet-shaped semi-conductive rubber layer SC1, and a high-permittivity rubber layer HP1 molded on the entirety of an outer periphery of the semi-conductive rubber layer SC1 or about an electrode edge thereof formed with a curvature.

Figure 11A:
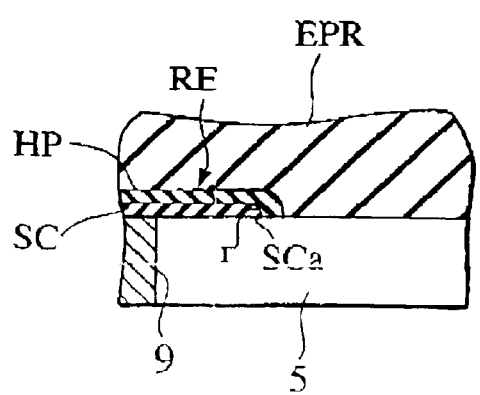
FIG. 11A is a section of a power transmitting portion of a power cable connection structure illustrating the content of find of the inventors.
Figure 11B:
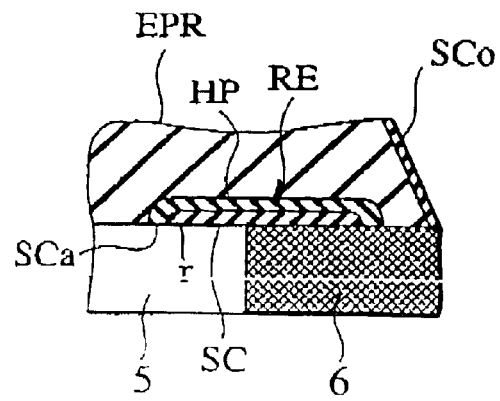
FIG. 11B is a section of a screening portion of a power cable connection structure illustrating (be content of find of the inventors.

For medium/high-voltage power oriented CV cables, the radius (r in FIGS. 11A and 11B) of termination may preferably be set to 0.5 mm or more.

Figure 6:
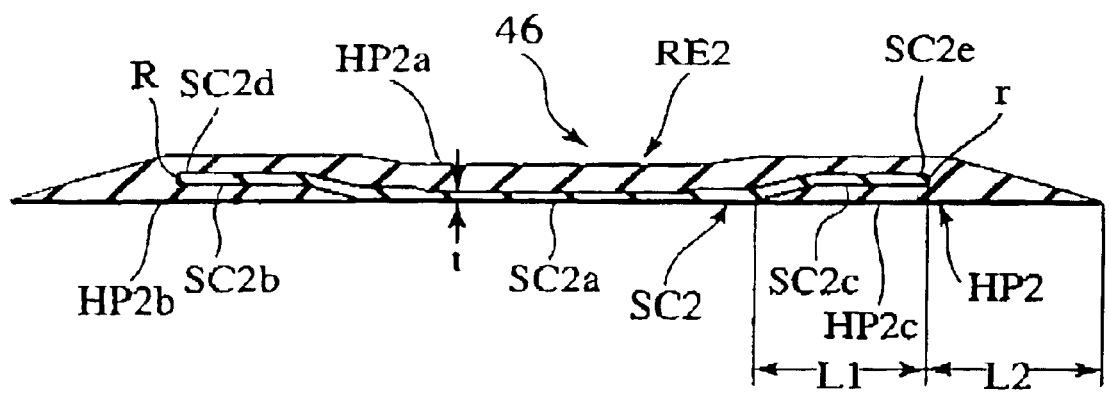
FIG. 6 is a longitudinal section of a rubber electrode layer of the connection member of FIG. 5.
Figure 7:
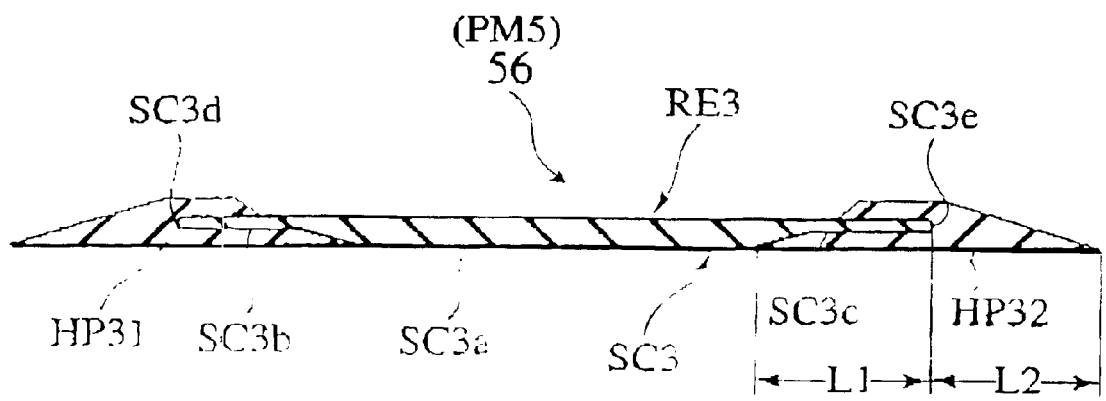
FIG. 7 is a longitudinal section of a rubber electrode layer of a pre-molded connection member according to another embodiment of the invention.

The semi-conductive rubber layer SC1 may preferably be configured at a side part thereof to penetrate or extend to the interior of high-permittivity rubber layer HP1 as in FIG. 6 or FIG. 7. In this case, the penetrating or extending length of semi-conductive rubber layer SC1 (L1 in FIG. 6 or FIG. 7) may preferably be set to 10 mm or less, and the remaining axial length (L2 in FIG. 6 or FIG. 7) of high-permittivity rubber layer HP1 may preferably be set within a range over 5 mm to an adequate dimension determined by an electric field analysis so that the electric stress concentration is kept under a critical value.

Figure 9:
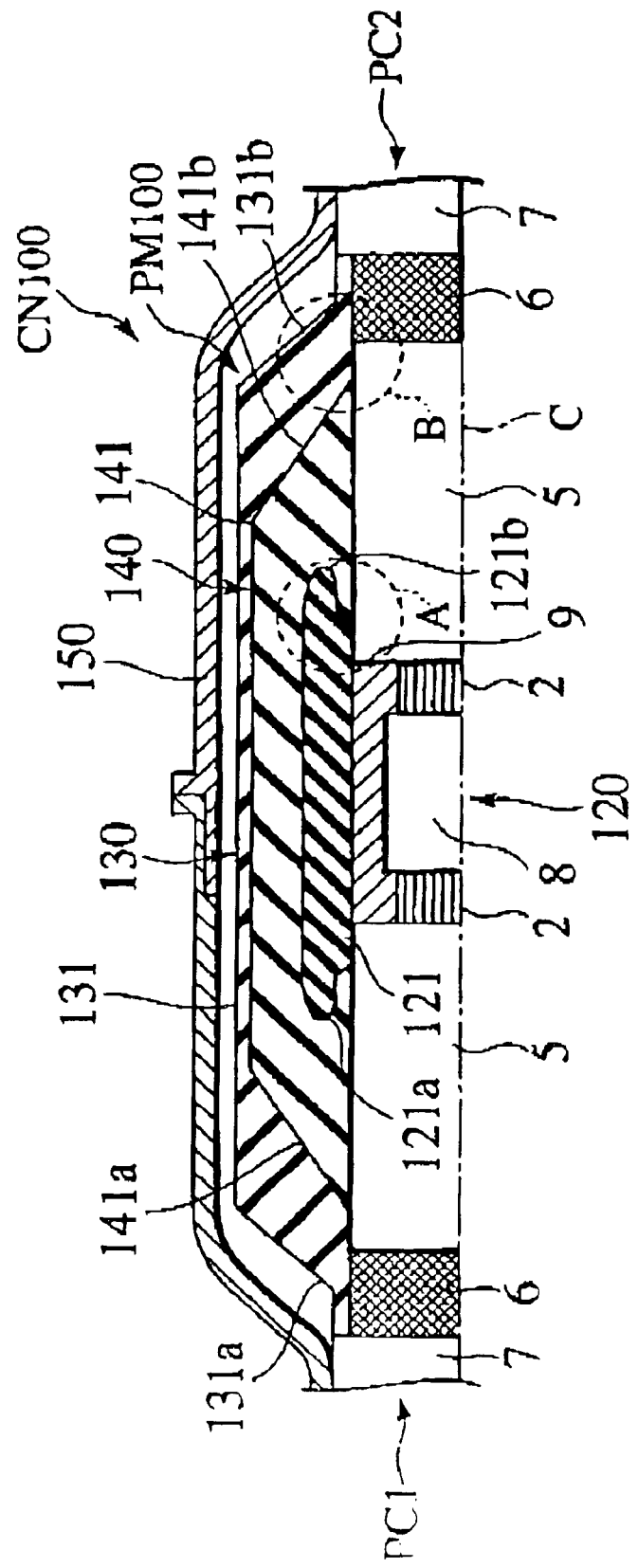
FIG. 9 is a longitudinal section of a conventional connection structure employed for electrical connection of plastic-insulated power cables.
Figure 10A:
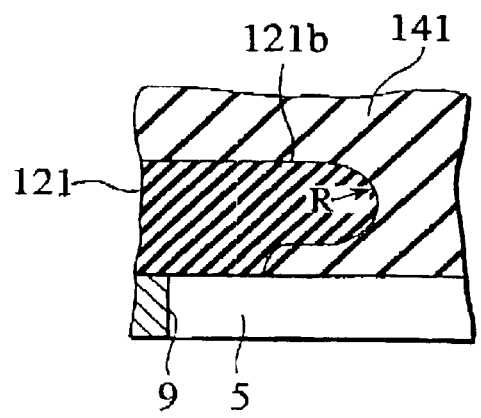
FIG. 10A is a detail of part-A of FIG. 9.
Figure 10B:
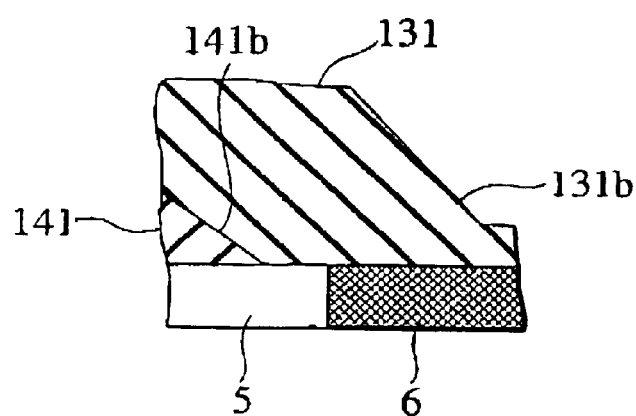
FIG. 10D is a detail of part-B of FIG. 9.

As discussed ever in conjunction with FIG. 9, in place of the protection case 15, there may preferably be employed a structure in which a thermally shrinkable tube made of polyethylene or equivalent is fit water-tight on the screening portion SH, or a structure in which the screening portion SH is covered by a glass-fiber reinforced epoxy resin tube, with a compound filled water-tight in between.

Figure 2:
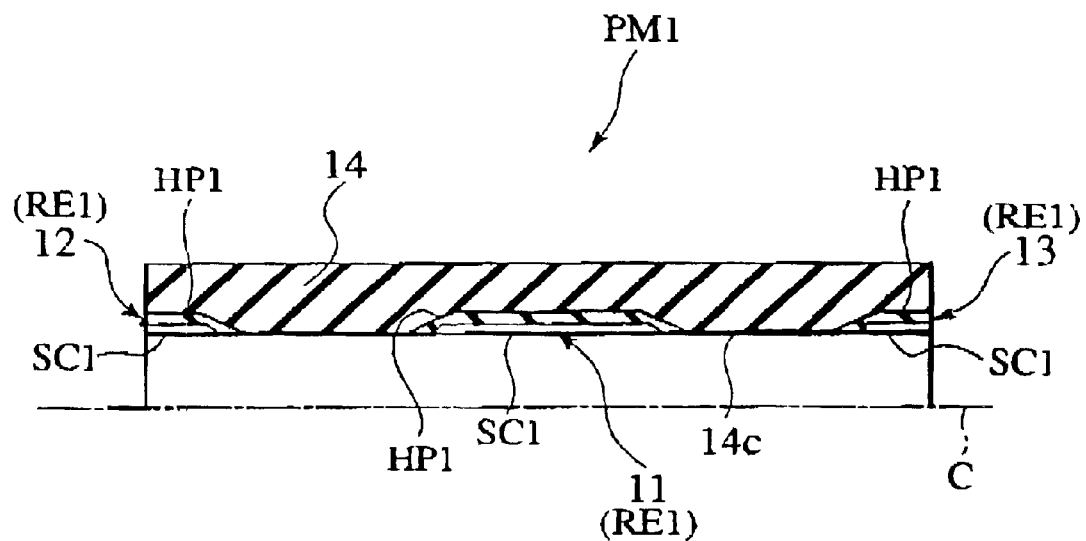
FIG. 2 is a longitudinal section of a pre-molded connection member according to an embodiment of the invention.

FIG. 2 shows a pre-molded connection member PM1 according to a second embodiment of the invention.

Figure 4:
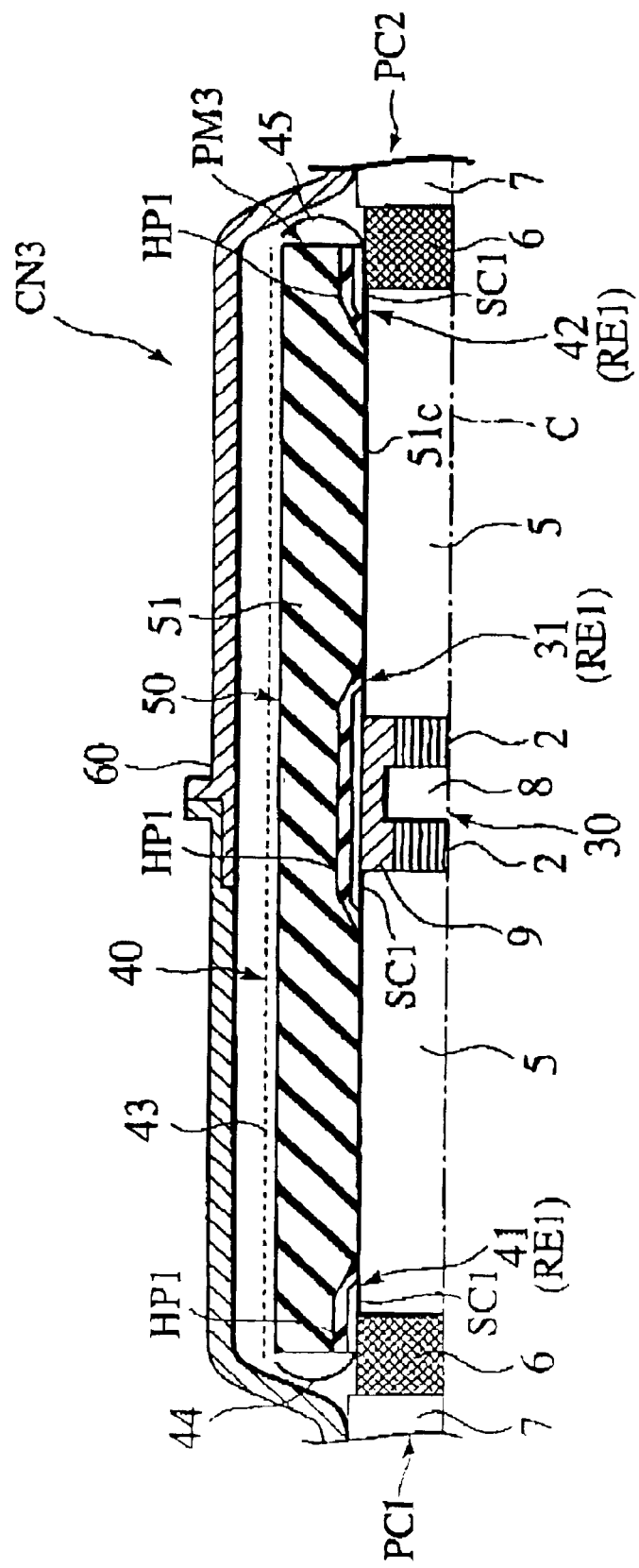
FIG. 4 is a longitudinal section of a connection structure for plastic-insulated power cables using a pre-molded connection member according to another embodiment of the invention.

The connection member PM1, as an integral mold called "rubber insulation tube" and adapted for electrical connection of power cables PC1 and PC2 having their plastic insulators 5 and 5 for insulation between their conductors 2 and 2 and screens 6 and 6 as shown in FIG. 4, and includes: a tin cylindrical rubber electrode 11 centrally disposed in the figure for electrical connection between the conductors 2 and 2 of power cables PC1 and PC2; thin cylindrical rubber electrodes 12 and 13 disposed at the left and right in the figure to electrically contact on the screens 6 and 6 of power cables PC1 and PC2; and a cylindrical rubber insulator 14 fit on the cable insulators 5 and 5 for insulation between the rubber electrodes 13–12 and 11–13.

The rubber electrodes 11, 12, and 13 are constituted as tubular rubber electrode layers RE1 (see FIG. 1) extending along an inner periphery 14c of the rubber insulator 14 and spaced from each other. They RE1 are fit at the working site, in positions on cables PC1 and PC2, for electrical connection with cable screens 6 and 6.

On an outer periphery of the rubber insulator 14, there is wound at the site of connection a semi-conductive rubber tape, over length of the rubber insulator 14, to thereby form a screen of a screening portion.

The connection member PM1 is made of an ethylene propylene rubber as a base material, which is excellent in molding workability and has a high insulation performance.

Figure 3:
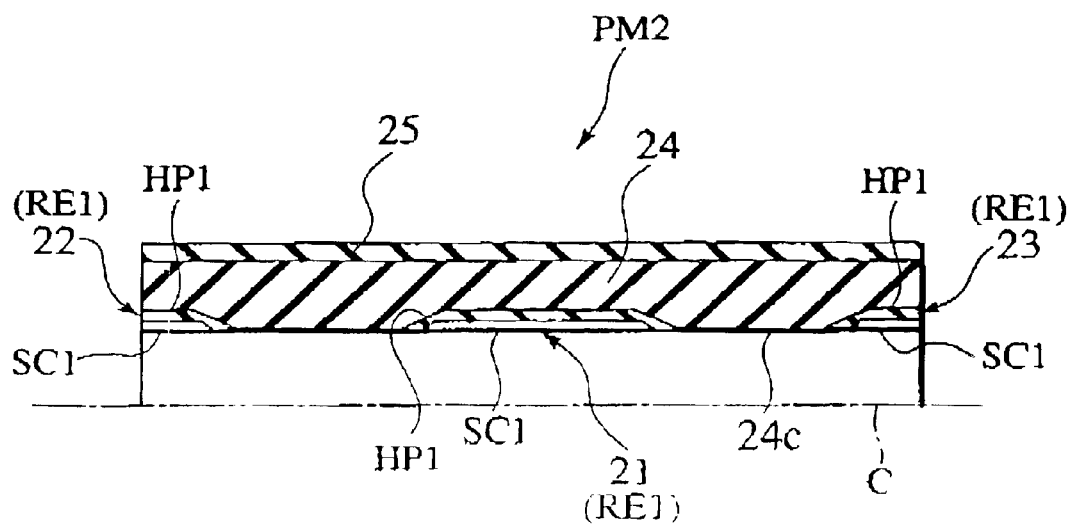
FIG. 3 is a longitudinal section of a pre-molded connection member according to another embodiment of the invention.

FIG. 3 shows a pre-molded connection member PM2 according to a third embodiment of the invention.

Also the connection member PM2, as an integral mold called "rubber insulation tube" and adapted for electrical connection of power cables PC1 and PC2 having their plastic insulators 5 and 5 for insulation between their conductors 2 and 2 and screens 6 and 6 its shown in FIG. 4, and includes: a thin cylindrical rubber electrode 21 centrally disposed in an inner periphery thereof for electrical connection between the cable conductors 2 and 2; thin cylindrical rubber electrodes 22 and 23 disposed at the left and right of the inner periphery to electrically contact on the cable screens 6 and 6; a tubular layer 25 of semi-conductive rubber molded on the entirety of outer periphery; and a cylindrical rubber insulator 24 fit on the cable insulators 5 and 5 for insulation between the rubber electrodes 21–22 and 21–23, as well as between those 21, 22, 23 and the tubular layer 25.

The rubber electrodes 21, 22, and 23 are constituted as tubular rubber electrode layers RE1 (see FIG. 1) extending along an inner periphery 24c of the rubber insulator 24 and spaced from each other. They RE1 are fit at the working site, in positions on cables PC1 and PC2, for electrical connection with cable screens 6 and 6.

The tubular layer 25 of semi-conductive rubber is wire-bonded to the screen 6 of at least one power cable PC1 or PC2.

The connection member PM2 has a structure of the connection member PM1, as the tubular layer 25 is integrally molded thereabout.

FIG. 4 shows a connection structure CN3 for plastic-insulated power cables PC1 and PC2 using a pre-molded connection member PM3 according to a fourth embodiment of the invention.

The connection structure CN3 includes: a transmission portion 30 configured for electrical connection between conductors 2 and 2 of power cables PC1 and PC2 at the left and right; a screening portion 40 configured for electrical connection between screens 6 and 6 of power cables PC1 and PC2; an insulating portion 50 filled between the transmission portion 30 and the screening portion 40 and configured to conformingly fit on bridged-plastic insulators 5 and 5 of power cables PC1 and PC2; and a two-piece separable protection case 60 configured to water-tightly fit on outer covers 7 and 7 of power cables PC1 and PC2, covering an outer periphery of the screening portion 40.

The transmission portion 30 is configured with a tubular conductor 8 fit on ends of the cable conductors 2 and 2, a layer 9 of rubber tape wound-fit on the tubular conductor 8 and remaining parts of the cable conductors 2 and 2, and a thin cylindrical rubber electrode 31 disposed in a central part of an inner periphery of the insulating portion 50 and fit conforming on the rubber tape wound layer 9 and ends of the cable insulators 5 and 5.

The screening portion 40 is configured with thin cylindrical rubber electrodes 41 and 42 disposed at left and right ends of the inner periphery of insulating portion 50 and electrically contacting on the cable screens 6 and 6, and a layer 43 of semi-conductive rubber tape or aluminum foil wound at the working site on the entirety of an outer periphery the insulating portion 50. However, in the case of provision of a semi-conductive tubular rubber layer 25 as in FIG. 3, the layer of semi-conductive rubber tape is unnecessary.

The insulating portion 50 is constituted as a tubular rubber insulator 51 with the rubber electrodes 31, 41, and 42 buried therein. This insulator 51 is fabricated in factory together with the rubber electrodes 31, 41, and 42, as an integral pre-molded connection member PM3 having polyethylene propylene as a base material.

The rubber electrodes 31, 41, and 42 are constituted as tubular rubber electrode layers RE1 (see FIG. 1) extending along an inner periphery 53c of the rubber insulator 51 and spaced from each other.

Therefore, the connection member PM3 is identical in structure to the connection member PM1. Use of the connection member PM3 facilitates screening work at the cable connection site.

In place of the protection case 60, there may preferably be employed a water-tight structure with a thermally shrinkable tube or by combination of an epoxy resin tube and a compound.

Figure 5:
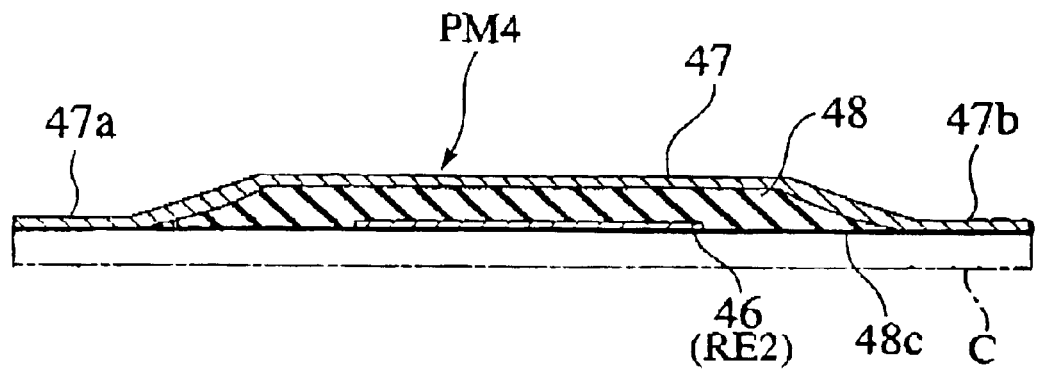
FIG. 5 is a longitudinal section of a pre-molded connection member according to another embodiment of the invention.

FIG. 5 shows a pre-molded connection member PM4 according to a fifth embodiment of the invention, and FIG. 6 shows a transmission oriented rubber electrode 46 of the connection member PM4.

Figure 8:
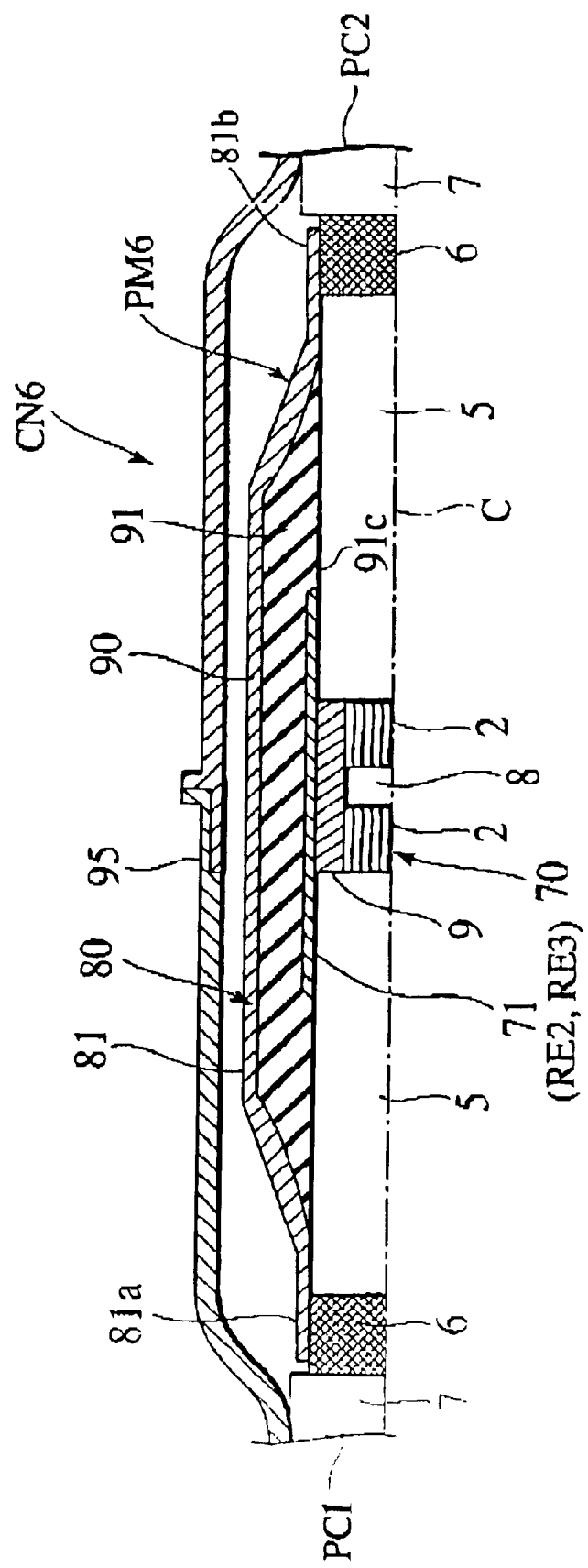
FIG. 8 is a longitudinal section of a connection structure for plastic-insulated power cables using a pre-molded connection member according to another embodiment of the invention.

The connection member PM4, as an ethylene propylene base integral mold called "rubber insulation tube" and adapted for electrical connection of power cables PC1 and PC2 having their plastic insulators 5 and 5 for insulation between their conductors 2 and 2 and screens 6 and 6 as shown in FIG. 8, and includes: a thin cylindrical rubber electrode 46 centrally disposed in an inner periphery thereof for electrical connection between the cable conductors 2 and 2; a tubular layer 47 of semi-conductive rubber extending over the entirety of outer periphery and contacting on the cable screens 6 and 6, from outside, at axially extending diameter-reduced ends 47a and 47b thereof; and a cylindrical rubber insulator 48 fit on the cable insulators 5 and 5 for insulation and reinforcement between the rubber electrode 46 and the tubular layer 47.

The rubber insulator 48 as well as the tubular layer 47 of semi-conductive rubber of the connection member PM4 may preferably be formed by winding a rubber tape at the connection site.

The rubber electrode 46 is constituted as a tubular rubber electrode layer RE2 extending along an inner periphery 48c of the rubber insulator 48. The rubber electrode layer RE2 is configured with a sheet-shaped semi-conductive rubber layer SC2, and a high-permittivity rubber layer HP2 molded on an outer periphery of the semi-conductive rubber layer SC2 or about an electrode edge thereof formed with a curvature, covering at least a vicinity of the peripheral edge of the semi-conductive rubber layer SC2.

In the connection member PM4, the semi-conductive rubber layer SC2 is formed with a straight tubu part SC2a fit on the wound layer 9 of conductive rubber tape between power cables PC1 and PC2, and left and right lifted parts SC2b and SC2c extending therefrom with a wall thickness t=1.5 mm in the embodiment and a diverged increased diameter. The high-permittivity rubber layer HP2 is formed with an outer layer part HP2a covering the entirety of an outer periphery of the semi-conductive rubber layer SC2, left and right inner layer parts HP2b covering respective inner peripheries of the left and right lifted parts SC2b and SC2c of semi-conductive rubber layer SC2. In other words, the lifted parts SC2b and SC2c of the semi-conductive rubber layer SC2 penerate to the interiors of high-permittivity rubber layer HP2, where they are buried. The penetration length L1 is within a range or 1 mm to 10 mm.

The lifted parts SC2b and SC2c are rounded at their end faces SC2d and SC2e by a radius of curvature substantially equivalent to half the thickness t of semi-conductive rubber layer SC2.

The high-permittivity rubber layer HP2 has remaining parts extending axially outside from the end faces SC2d and SC2e of lifted parts SC2b and SC2c, by an extension length or remaining width L2 set, within a range of L2=5 mm or more, to an adequate dimension determined by an electric field analysis so that the electric stress concentration is kept under a critical value.

FIG. 7 shows a rubber electrode 56 of a pre-molded connection member PM5 according to a sixth embodiment of the invention. This connection member PM5 is identical in structure to the connection meber PM4, except for the rubber electrode layer.

The rubber electrode 56 is constituted as a tubular rubber electrode layer RE3 extending along an inner periphery of a rubber insulator of the connection member PM5. The rubber electrode layer RE3 is configured with: a sheet-shaped straight-cylindrical semi-conductive rubber layer SC3 having a body part SC3$a$ and left and right thickness-reduced lifted edge parts SC3$b$ and SC3$c$; and left and right high-permittivity rubber layers HP31 and HP32 molded on inner and outer peripheries of the lifted edge parts SC3$b$ and SC3$c$ of semi-conductive rubber layer SC3. The lifted edge parts SC3$b$ and SC3$c$ extend to the interiors of high-permittivity rubber layers HP31 and HP32, where they are buried. The extention length L1 of high-permittivity rubber layer HP3 is set within a range of 1 mm to 10 mm: and the width L2 of axially extenting remaining part is set within a range of L2=5 mm or more, to an adequate dimension determined by an electric field analysis so that the electric stress concentration is kept under a critical value The lifted edge parts SC3$b$ and SC3$c$ are rounded at their end faces SC3$d$ and SC3$c$ by a radius of curvature substantially equivalent to half the thickness of edge parts SC3$b$ and SC3$c$.

FIG. 8 shows a connection structure CN6 for electrical connection of plastic-insulated power cables PC1 and PC2 using a pre-molded connection member PM6 according to a seventh embodiment of the invention.

The connection structure CN6 includes; a transmission portion 70 configured for electrical connection between conductors 2 and 2 of power cables PC1 and PC2 at the left and right; a screening portion 80 configured for electrical connection between screens 6 and 6 of power cables PC1 and PC2; an insulating portion 90 filled between the transmission portion 70 and the screening portion 80 and configured to conformingly fit on bridged-plastic insulators 5 and 5 of power cables PC1 and PC2; and a two-piece separable protection case 95 configured to water-tightly fit on outer covers 7 and 7 of power cables PC1 and PC2, covering an outer periphery of the screening portion 80.

The transmission portion 70 is configured with a tubular conductor 8 fit on ends of the cable conductors 2 and 2, a layer 9 of rubber tape wound-fit on the tubular conductor 8 and remaining parts of the cable conductors 2 and 2, and a thin cylindrical rubber electrode 71 disposed in a central part of an inner periphery of the insulating portion 90 and fit conforming on the rubber tape wound layer 9 and ends of the cable insulators 5 and 5.

The screening portion 80 is constituted as a cylindrical layer 81 of semi-conductive rubber covering the entirety of outer periphery of insulating portion 90, and electrically contacting, at left and Tight diameter-reduced tapered ends 81$a$ and 81$b$ thereof, on the cable screens 6 and 6.

The insulating portion 90 is constituted as a tubular rubber insulator 91 with the rubber electrode 71 buried therein. This insulator 91 is fabricated in factory together with the rubber electrode 71, as the connection member PM6 to be integrally pre-molded with polyethylene propylene as a base material.

In the connection meber PM6, the rubber insulator 91 as well as the cylindrical layer 81 of semi-conductive rubber may preferably be formed at the connection site by winding a rubber tape.

The rubber electrode 71 is constituted as a tubular rubber electrode layer RE2 (see FIG. 6) extending along an inner periphery 91$c$ of the rubber insulator 91.

Therefore the connection member PM6 is identical in structure to the connection member PM4. It may preferably have an identical structure to the connection member PM5.

In place of the two-piece separable protection case 95, there may preferably be employed a water-tight structure with a thermally shrinkable tube or by combination of an epoxy resin tube and a compound.

In some embodiments of the invention, in palce of a stress cone conventionally required for magnetic shield and control of electric field concentration, there is used a cylindrical rubber insution tube formed, at a high-potential side and a low poential side of an inner layer thereof, with sheet-shaped electrodes each respectively comprised of a semi-conductive layer and a high-permittivity insulation layer for controlling electric concentration.

The rubber insulation tube is constituted as an integral premold of a plurality of layers using a rubber insulation material as a base, having sheet-shaped electrodes formed in a central part and at both ends thereof, each respectively with a semi-conductive rubber layer on the inside and a high-permittivity rubber layer on the outside.

For connection of power cables, each cable is stepwise stripped at its end, to have the condutor, insulator, and screen exposed to fit the rubber insulation tube thereon.

The inner electrode of rubber insulation tube is sheet-shaped with a thickness of 5 mm or less, and the semi-conductive rubber layer covered with the high-permittivity rubber layer is terminated at edges thereof by a radius of curvature substantially equivalent to half the sheet thickness. The semi-conductive rubber layer may preferably be separated from the cable insulator to lift in the high-permittivity rubber layer. The thickness of semi-conductive rubber layer may preferably be set within a range of 1 mm to 5 mm. For the lifted part, it may preferably be set within a range of 0.5 mm or more. Therefore, also the thickness of high-permittivity rubber layer between the lifted part of semi-conductive rubber layer and and the cable insulator is set within a range of 0.5 mm or more, which however appears adequate to be thin for moderation of electric stress concentration at interfacial regions between cables, as well as for workability.

According to the embodiments, therefore, the rubber insulation tube has a simplified screening structure, with advantages such as in mold configuration, molding time, and manufacturing cost.

The rubber insulation tube has a reduced thickness allowing for the insulation tube itself as well as connection structure of powre cables to be compact, with facilitated connection work.

The present applicatoin claims the benefit of priority based on Japanese Patent Application No. 2001-361148, filed on Nov. 27, 2001, in the Japanese Patent Office, and Japanese Patent Application No. 2001-37124, filed on Dec. 7, 2001, in the Japanese Patent Office, of which whole contents are incorporated herein by reference.

While preferred embodiments of the present invention have been described using specific terms, such description is for illustrative purposes, and it is to be understood that changes and variations may be wade without departing from the spirit or scope of the following claims.

What is claimed is:

1. A connection structure for electrical connection of power cables, comprising:
   a transmission portion having a first rubber electrode configured for electrical connection of a cable conductor;

a screening portion having a second rubber electrode configured for electrical connection of a cable screen; and an insulating portion having a rubber insulator configured for insulation between the first and second rubber electrodes, wherein
at least one of the first and second rubber electrodes comprises a rubber electrode layer configured with:
a sheet-shaped semi-conductive rubber layer; and
high-permittivity rubber layer covering at least one side of a peripheral part of the semi-conductive rubber layer.

2. A connection structure according to claim 1, wherein the first rubber electrode comprises a first rubber electrode layer, the second rubber electrode comprises a pair of second rubber electrode layers, and each of the first and second rubber electrode layers has the high-permittivity rubber layer covering an entirety of an outer periphery of the semi-conductive rubber layer.

3. A connection structure according to claim 2, wherein the second rubber electrode further comprises a layer of semi-conductive rubber formed on an outer periphery of the rubber insulator.

4. A connection structure according to claim 2, wherein one of the pair of second rubber electrode layers has the semi-conductive rubber layer contacting at an inner periphery thereof on the cable screen.

5. A connection structure according to claim 1, wherein the first rubber electrode comprises the rubber electrode layer, and the second rubber electrode comprises a layer of semi-conductive rubber formed on an outer periphery of the rubber insulator.

6. A connection structure according to claim 5, wherein the rubber electrode layer has the high-permittivity rubber layer covering an entirety of an outer periphery of the semi-conductive rubber layer.

7. A connection structure according to claim 5, wherein the rubber electrode layer has the high-permittivity rubber layer covering both sides of the peripheral part of the semi-conductive rubber layer.

8. A connection structure according to claim 5, wherein an inner periphery of the layer of semi-conductive rubber contacts cable screen.

9. A connection structure according to claim 1, wherein the peripheral part of the semi-conductive rubber layer has an end face thereof rounded by a radius within a range of 0.5 mm or more.

10. A connection structure according to claim 1, wherein the peripheral part of the semi-conductive rubber layer is separated from a cable insulator and extends into a corresponding part of the high-permittivity rubber layer.

11. A connection structure according to claim 10, wherein the high-permittivity rubber layer has a part thereof extending between the peripheral part of the semi-conductive rubber layer and the cable insulator, by a length within a range of 1 mm to 10 mm.

12. A connection structure according to claim 1, wherein the corresopnding part of the high-permittivity rubber layer has a remaining width within a range of 5 mm or more in a cable connecting direction.

13. A connection structure according to claim 1, wherein the rubber electrode layer is molded.

14. A connection structure according to claim 13, wherein the insulating portion is integrally molded with the rubber electrode layer.

15. A connection structure according to claim 13, wherein the screening portion is integrally molded with the insulating portion.

16. A connection structure according to claim 1, wherein the insulating portion comprises an insulating tape material wound on an outer periphery of the power transmitting portion.

17. A connection structure according to claim 1, wherein the screening portion comprises a conductive or semi-conducive tape material wound on an outer periphery of the insulating portion.

18. A connection structure according to claim 1, wherein the rubber electrode layer extends along an inner periphery of the rubber insulator.

19. A connection structure according to claim 18, wherein the power cables have a bridged polyethylene cable insulator between the cable conductor and the cable screen, and the rubber electrode layer is fit on the cable insulator.

20. A connection structure according to claim 1, wherein the high-permittivity rubber layer has a specific permittivity equivalent to or greater than a specific permittivity of a cable insulator times five.

21. A connection member for electrical connection of power cables, comprising:
a first rubber electrode configured for electrical connection of a cable conductor;
a second rubber electrode configured for electrical connection of a cable screen; and
a rubber insulator configured for insulation between the first and second rubber electrodes, wherein
at least one of the first and second rubber electrodes comprises a rubber electrode layer configured with:
a sheet-shaped semi-conductive rubber layer; and
a high-permittivity rubber layer covering at least one side of a peripheral part of the semi-conductive rubber layer.

* * * * *